Patented Sept. 9, 1924.

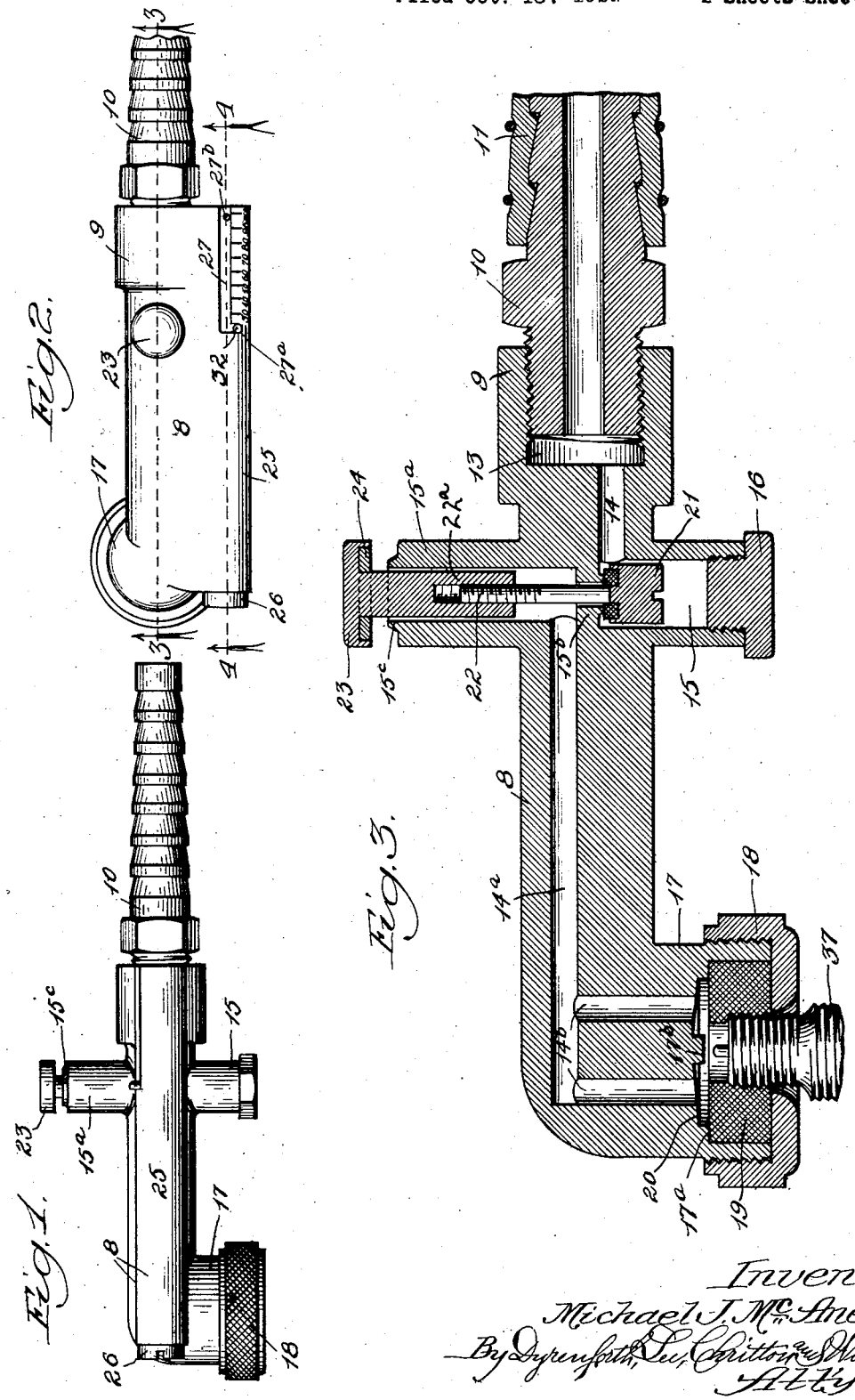

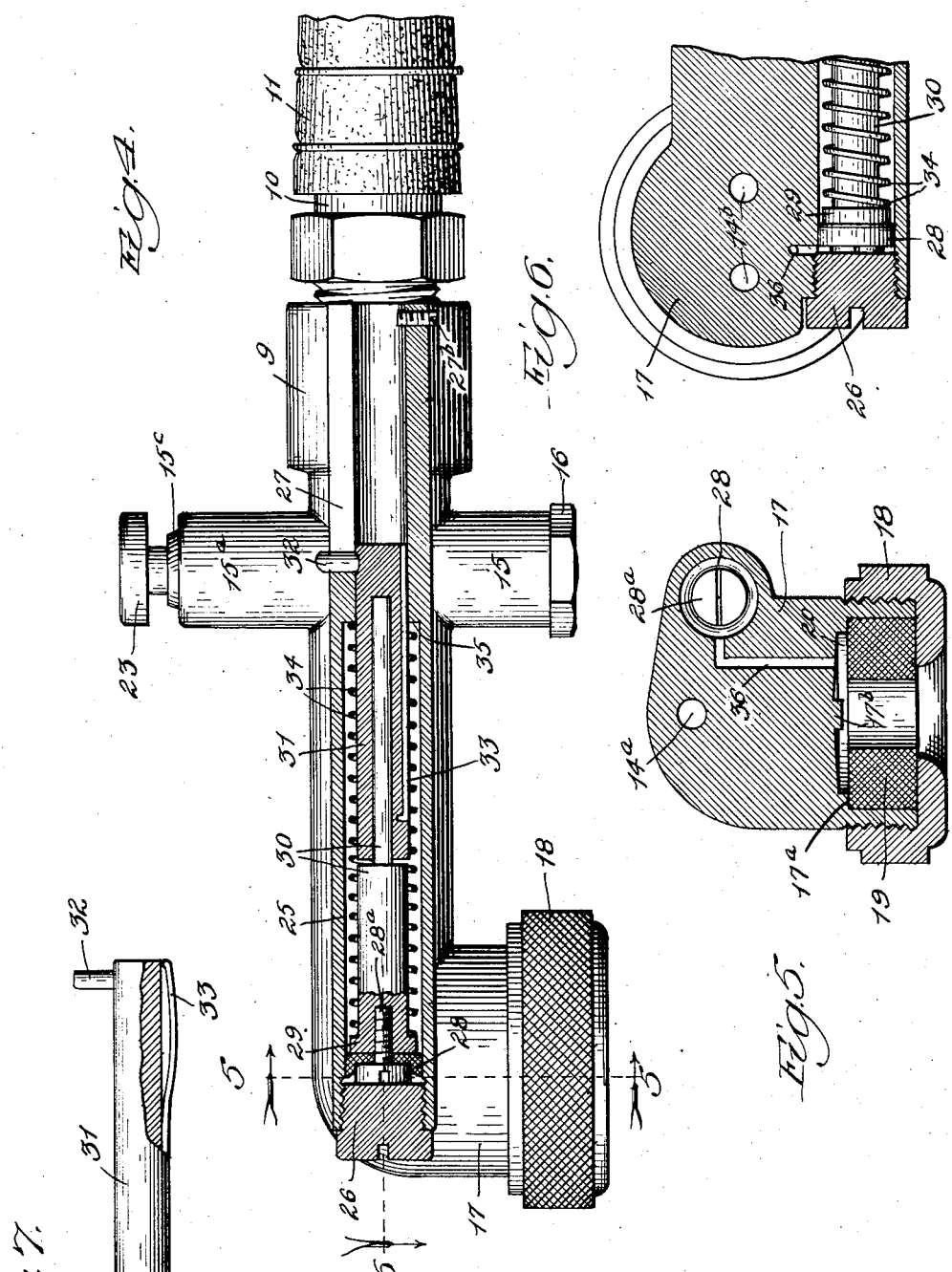

1,507,754

UNITED STATES PATENT OFFICE.

MICHAEL J. McANENY, OF DENVER, COLORADO, ASSIGNOR OF ONE-HALF TO E. N. STROM, OF CHICAGO, ILLINOIS.

COMBINED PNEUMATIC-TIRE INFLATING AND PRESSURE-GAUGE TOOL.

Application filed October 18, 1922. Serial No. 595,336.

*To all whom it may concern:*

Be it known that I, MICHAEL J. McANENY, a citizen of the United States, residing at Denver, in the county of Denver and State of Colorado, have invented a new and useful Improvement in Combined Pneumatic-Tire Inflating and Pressure-Gauge Tools, of which the following is a specification.

My invention is a tool combining a connector-device for use on the end of a tire-inflating hose and application to the valved nipple on a pneumatic tire for inflating it, and a pressure gauge for similar application to ascertain the amount of air-pressure lacking in such tire preparatory to inflating it; and it is fully described in the specification and illustrated in the accompanying drawings, in which—

Figure 1 is a view in side elevation of the combined tool;

Figure 2 is a plan view of the same with a portion of the hose-connecting nipple broken away;

Figure 3 is an enlarged section on line 3—3, Fig. 2, showing the inflating member of the tool applied to a valved tire-nipple;

Figure 4 is an enlarged section through the pressure-gauge member of the tool on line 4—4, Fig. 2;

Figures 5 and 6 are sections respectively on the lines 5—5 and 6—6, Fig. 4, and

Figure 7 is an enlarged broken view in side elevation of the hollow gauge-bar on the valve-stem of the pressure-gauge member.

A casing 8, preferably a casting, is formed as an integral body and contains the two devices, respectively for inflating a pneumatic tire and ascertaining the amount of air pressure contained in such a tire. One section of the casing terminates at its rear end in a socket 9, into which is screwed the threaded end of the nipple 10 for attaching the hose 11 leading from a suitable source of air-pressure supply (not shown). The threaded end of the hose-nipple forms with the inner end of the socket a chamber 13, from the base of which extends a relatively short air-passage 14 terminating in the tubular valve-chamber 15 of a valve-device, the chamber projecting at a right-angle from one side of the casing and having its outer end closed by a screw-plug 16. The chamber 15 communicates through a centrally perforated wall 15$^b$ therein (Fig. 3) with a tubular extension 15$^a$ similarly projecting from the casing 8, but from the opposite side thereof, and provided with a seat 15$^c$ about its open outer end. This casing-section terminates at its forward end in a nozzle 17, on which is screwed a knurled cap 18 confining against a shoulder 17$^a$ in the nozzle-end of a gasket 19 of rubber or other suitable material. From the inner end of the valve-chamber extension 15$^a$ there extends lengthwise in this casing-section an air-passage 14$^a$, as a continuation of the passage 14, and communicating from its outer-end portion with an air-chamber 20 in the face of the nozzle (and extending over the gasket 19) through a pair of similar branch air-passages 14$^b$, between which a beak 17$^b$ projects centrally from the nozzle-face. The chamber 15 contains a valve 21 seating at the gasket shown thereon against the under face of the wall 15$^b$ and carried on the inner end of a threaded stem 22, which passes through the perforated wall into the valve-chamber extension 15$^a$, wherein it screws into the inner end of the stem-enlargement 22$^a$, terminating at its outer end in a button 23 provided on its under side with a facing 24 preferably of rubber to engage the seat 15$^c$ for hermetically sealing the adjacent end of the chamber-extension 15$^a$ by depressing the button to unseat the valve 21.

The other section of the casing is formed of a tubular piston-housing 25 having its forward end closed by a screw-plug 26 and containing a longitudinal slot 27 in the top of its rear-end portion (Fig. 2), the seat having scale-marks along one side at intervals denoting successive ten-pound gradations of pressure and numbered accordingly, as from 30 to 100; and the slot is provided with a notch 27$^a$ in the outer edge of its forward end for the purpose hereinafter explained. The housing 25 contains a piston having a gasket or cup 28, of leather or other suitable material, fitting the bore and secured to the piston-head 29 by a headed screw 28$^a$, the piston-stem 30 having its forward section of relatively-large diameter and its rear, narrower section extending lengthwise into a hollow gauge-bar 31 to the closed end thereof, from which a pointer 32 projects through the slot and enters the notch 27$^a$ to lock it against longitudinal movement when the pressure-gauge member is out of use, as hereinafter explained; and along the exterior of the gauge-bar a leaf spring 33 extends to bear against the inner surface of the housing 25 and produce frictional resistance against unduly free longitudinal movement therein of the bar. A helical spring 34 surrounds the larger section of the piston-stem 30 and the bar 31 and is endwise confined between a rear-shoulder 35 in the housing 25 and the piston-head 29.

An air-passage 36 (Fig. 5) in the nozzle 17, which is common to both members of the tool, leads from the nozzle-chamber 20 into the piston-housing 25 near its forward end and registers at its mouth with the slot in the head of the screw 28ª when the piston is in its normally advanced position represented in Fig. 4.

It is desirable to be able to conveniently ascertain the amount of air-pressure in a tire particularly before inflating it, in order to find the extent of lack of pressure therein and the extent of inflation required. To use the tool, the nozzle 17 is applied to the valved nipple 37 (Fig. 3) of a pneumatic tire. If the purpose be to first ascertain the amount of air-pressure in the tire, the button 23 is screwed on the stem 22 to engage the seat 15ᶜ, hermetically seal the passage 15ª and close the valve 21 and the nozzle is depressed over the tire-nipple far enough to engage the beak 17ᵇ with the nipple-valve to unseat the valve. With this valve thus opened, air from the tire rushes through the nozzle and passage 36 into the housing 25 against the piston 29 therein. The pointer 32 having been preparatorily released from the notch 27ª (Fig. 2), the pressure against the piston forces it backwardly against resistance of the spring 34 to move the gauge-bar in the slot 27 along the scale until the pointer stops at or near the number thereon denoting the amount of air-pressure in the tire, the tension of the spring 34 being such as to effect that result. A stop is shown at 27ᵇ (Figs. 2 and 4) to limit the outward movement of the bar 31.

For inflating the tire, the nozzle 17 need not be applied so deeply on the nipple 27 as for the expanding purpose, since the valve in the nipple will be opened by introducing the inflating air, which is effected with the nozzle in place by depressing the previously raised button 23 to seal the chamber 15ª and unseat the valve 21 (Fig. 3), whereupon (but with the bar 31 previously locked by turning it, while in its innermost or retracted position in the housing 25 to introduce the pointer 32 into the notch 27ª) air-pressure from the source of supply will flow through the hose-nipple 10 and passages 14, 14ª and 14ᵇ into the tire while the operator holds the valve 21 open by continuing to hold the button 23 on its seat.

The air-pressure thus flowing fills the nozzle-chamber 20 to compress the gasket 19 about the tire-nipple and thereby hug the latter to prevent leakage; but while such air-pressure also enters the passage 36 to the housing 25, it cannot operate the pressure-gauge member of the tool by reason of the piston 29 being locked against movement by the pointer 32 in the notch 27ª. However, should the operator desire to ascertain, from time to time during the inflating operation, the amount of air-pressure lacking in the tire for its complete or predetermined extent of inflation, this may be done without removing the tool from its operative position, by releasing the valve 21 to permit closure thereof for shutting off the flow and screwing the button 23 down upon its seat to prevent exhaustion through the chamber-section 15ª of the pressure in the tool after unlocking the bar 31 and depressing the nozzle, if necessary, to engage the beak 17ᵇ with the tire-valve for opening it and cause the air-pressure from the tire to operate the pressure-gauge in the manner hereinbefore described; after which the bar 31 may again be set into locked position and, if further inflation is desired, the valve 21 re-opened for the purpose in the manner already explained. The exhaustion through the chamber 15ª, referred to, permits the gasket 19 to expand from about the tire-nipple which facilitates withdrawal of the nozzle therefrom.

Of course, upon application of the nozzle to a tire-valve the tool may be used for either of its purposes without using it for the other unless desired.

I realize that considerable variation is possible in the details of the construction herein shown and described, and I do not intend to limit myself thereto except as pointed out in the appended claims in which it is my intention to claim all the novelty inherent in the tool as broadly as is permitted by the state of the art.

I claim:

1. A pneumatic-tire inflating and pressure-gauge tool comprising a casing having two sections and provided on one end with a nozzle, a valve-controlled air-pressure passage extending in one section of the casing into said nozzle, and a pressure-gauge in the other casing-section, comprising a tubular valve-housing into which an air-passage leads through the nozzle, a spring-pressed piston in the housing, means for releasably locking the piston in the normal position, and means operatively connected with the spring-pressed piston to indicate the pressure exerted thereon through said passage leading into the housing when said lock is released.

2. A pneumatic-tire inflating and pressure-gauge tool comprising a casing having two sections and provided on one end with a nozzle containing a gasket of compressible and expansible material and an air-chamber extending over said gasket, a valve-controlled air-pressure passage extending in one section of the casing to said air-chamber, and a pressure-gauge in the other casing-section, comprising a tubular piston-housing communicating at one end with said air-chamber through an air-passage, a spring-pressed piston in the housing normally pressed to its end adjacent said last-named passage and provided with means for releasably locking it in the normal position, means to permit escape of air from said passage at the will of the operator, and means operatively connected with the spring-pressed piston to indicate the pressure exerted thereon through said passage leading into the housing.

3. A pneumatic-tire inflating and pressure-gauge tool comprising a casing having two sections and provided on one end with a nozzle, a valve-controlled air-pressure passage extending in one section of the casing into said nozzle, and a pressure-gauge in the other casing-section, comprising a tubular piston-housing into the forward end of which an air-passage leads through the nozzle, said housing having a gauge-slot in its opposite end, a valve in said housing normally spring-pressed to the end thereof adjacent said passage leading thereto, and a gauge-bar on the piston-stem provided with a pointer projecting through said slot and engageable with a notch in said slot to releasably lock the piston in its passage-closing position.

MICHAEL J. McANENY.